Figure 1:
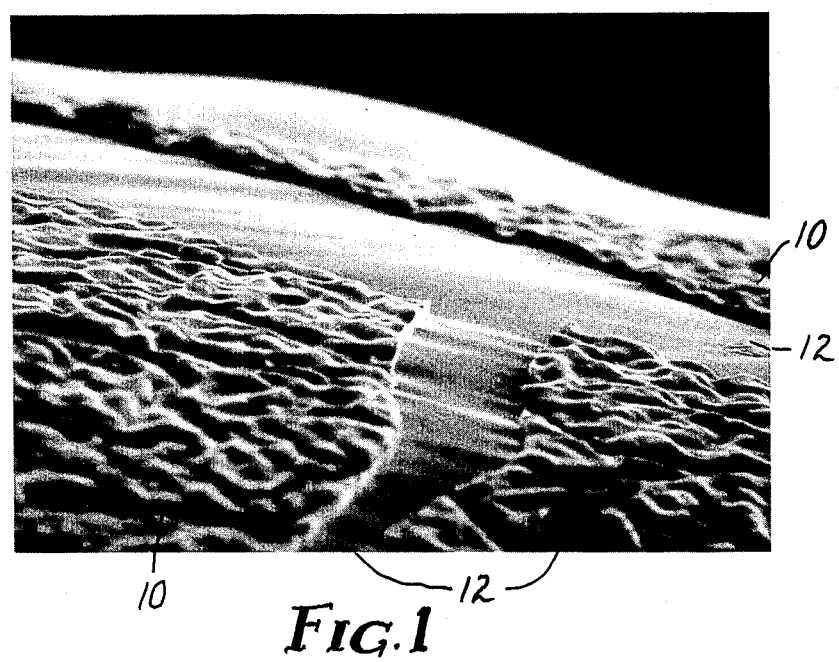

United States Patent [19]

Larimore et al.

[11] Patent Number: 4,751,108

[45] Date of Patent: Jun. 14, 1988

[54] METHOD OF MAKING A PRESSURE-SENSITIVE ADHESIVE TAPE HAVING A SUBSTANTIALLY TACK-FREE SURFACE

[75] Inventors: Franklin C. Larimore, Shoreview; Robert A. Sinclair, St. Paul, both of Minn.

[73] Assignee: Minnesota Mining and Manufacturing Company, St. Paul, Minn.

[21] Appl. No.: 1,237

[22] Filed: Jan. 7, 1987

Related U.S. Application Data

[62] Division of Ser. No. 712,277.

[51] Int. Cl.$^4$ .......................... B05D 5/10; B05D 3/107
[52] U.S. Cl. ................................. 427/171; 427/208; 427/208.8; 427/204; 427/284; 427/333.0; 427/340; 427/341; 427/342; 427/352; 427/385.5
[58] Field of Search ............... 427/208.8, 322, 264, 427/324, 333, 340, 284, 341, 385.5, 342, 352, 171, 208

[56] References Cited

U.S. PATENT DOCUMENTS

| | | | |
|---|---|---|---|
| Re. 24,906 | 12/1960 | Ulrich | 428/343 |
| 2,294,347 | 8/1942 | Bauer et al. | 428/196 |
| 3,740,366 | 6/1972 | Sanderson et al. | 524/398 |
| 3,865,770 | 2/1975 | Blake | 156/327 |
| 4,374,883 | 2/1983 | Winslow | 428/212 |
| 4,440,821 | 4/1984 | Komura et al. | 428/195 |
| 4,524,087 | 6/1985 | Engel | 427/2 |
| 4,558,888 | 12/1985 | Hanson et al. | 428/352 |

Primary Examiner—Bernard D. Pianalto
Attorney, Agent, or Firm—Donald M. Sell; James A. Smith; Dale E. Hulse

[57] ABSTRACT

A pressure-sensitive adhesive layer is crosslinked between carboxyl groups along one surface by polyvalent cations, thus making that surface substantially tack-free while leaving at least one broad surface of the layer tacky and pressure-sensitive. When a broad surface of the adhesive layer is thus made completely tack-free, the adhesive layer can be wound upon itself in roll form without a backing for convenient storage and shipment. Preferably a low-adhesion backsize coating covers the broad tack-free surface to insure that the adhesive layer can be unwound after prolonged storage without delaminating.

17 Claims, 1 Drawing Sheet

METHOD OF MAKING A PRESSURE-SENSITIVE ADHESIVE TAPE HAVING A SUBSTANTIALLY TACK-FREE SURFACE

This is a division of application Ser. No. 712,277, filed Mar. 15, 1985, now abandoned.

FIELD OF THE INVENTION

The invention concerns pressure-sensitive adhesive tape which normally is produced in wide widths that may be sold as such but usually are slit to narrow widths to be wound up for convenient storage and shipment. The invention especially concerns pressure-sensitive adhesive tapes which transmit water vapor, a property advantageous for medical purposes.

BACKGROUND ART

Known pressure-sensitive adhesive tapes are comprised of two distinct layers, namely, an adhesive layer and a backing layer which supports the adhesive layer. When the adhesive and backing layers are inseparably united, the backing usually is responsible for more than half of the cost of the tape. In tapes made for medical purposes, the backing can be several times more expensive than the adhesive layer. Upon applying a pressure-sensitive adhesive tape to a compound surface, the backing may cause the tape to pucker and hence become poorly adhered. Where a compound surface flexes, for example a person's knee, the tape may soon loosen and fall off. While these problems can be lessened by employing highly conformable backings, it is believed no pressure-sensitive adhesive tape has a utilitarian backing of reasonable cost that has a conformability even approaching that of a pressure-sensitive adhesive layer.

OTHER PRIOR ART

Possibly the most versatile class of pressure-sensitive adhesive tapes is disclosed in U.S. Pat. No. Re. 24,906 (Ulrich), the adhesive layers of which are copolymers of (a) one or more acrylic acid esters of non-tertiary alkyl alcohol having a chain of 1 to 14 carbon atoms, and (b) one or more copolymerizable monomers such as the vinyl carboxylic acid monomers acrylic acid, methacrylic acid, and itaconic acid. This class of pressure-sensitive adhesives has a host of uses and is especially useful for medical purposes since, among other reasons, they need contain no tackifiers or other materials which might cause allergic reactions.

U.S. Pat. No. 3,740,366 (Sanderson et al.) reports that when a carboxyl-containing, pressure-sensitive adhesive polymer of the Ulrich patent is crosslinked between carboxyl groups by polyvalent metal cations, improved shear resistance is obtained without appreciable loss of tackiness if the polymer is "derived from up to 4.5% of the total momomers of an alpha,beta-ethylenically unsaturated carboxylic acid" (col. 1, lines 64–66). At higher carboxylic acid proportions, polymers would appreciably lose tackiness and become increasingly less soft and compliant unless restricted amounts of polyvalent metal cations were employed.

A class of pressure-sensitive adhesive tapes which are closely related to those of the Ulrich patent are disclosed in U.S. Pat. No. 3,865,770 (Blake), their adhesive layers being copolymers of (a) about 90–20 parts by weight acrylic acid ester of non-tertiary alkyl alcohol having a chain of 1 to 14 carbon atoms, (b) about 10–80 parts by weight copolymerizable vinyl carboxylic acid monomer, some of the carboxyl groups of which have been neutralized by reaction with an alkanolamine, and (c) tack-promoting material in an amount sufficient to provide a certain tackiness. Pressure-sensitive adhesive tapes of this class are water-dispersible or water-soluble and also display good tack and heat stability, thus being especially useful for making splices in papermaking and printing operations. Tapes of this class also are suitable for biomedical electrodes, because of their low electrical impedance and good adhesion and precise conformability to skin.

In another class of pressure-sensitive adhesive tapes, the adhesive layers are made by polymerizing an adhesive precursor comprising (1) a water-soluble polyhydric alcohol which is a liquid at about 20° C., (2) an ionic unsaturated free radically polymerizable material which is soluble in said polyhydric alcohol, e.g., acrylic acid, (3) a free radical initiator soluble in said polyhydric alcohol, and (4) a crosslinking agent of a multifunctional unsaturated free radically polymerizable material soluble in said polyhydric alcohol. As disclosed in U.S. Pat. Application Ser. No. 514,950 filed July 18, 1983 now U.S. Pat. No. 4,524,087 (Engel), a coating of said precursor can be polymerized to a pressure-sensitive adhesive state, preferably by exposure to ultraviolet radiation. The resulting pressure-sensitive adhesive layer retains a significant amount of water which affords moderate electrical conductivity that can be enhanced by adding electrolytes to the water. Because of their electrical conductivity and because they have good adhesion and precise conformability to skin, these adhesive layers are used in biomedical electrodes which are adhesively attached to the human skin.

DISCLOSURE OF INVENTION

The invention provides a pressure-sensitive adhesive tape which comprises an adhesive layer, but need not have a backing in that the adhesive layer can have adequate strength to permit it to be used without a backing. The adhesive layer of a preferred tape of the invention has one broad, tacky and pressure-sensitive face and one broad, substantially tack-free face which can serve the function of an ordinary backing and thus eliminate the expense of a backing. When a separate backing member is eliminated, the novel tape has marvelous conformability.

The foregoing capabilities are possessed by a pressure-sensitive adhesive tape, the adhesive layer of which comprises a polymer of which carboxyl groups originally comprise at least 1% of the weight, the polymer along one surface of the layer being substantially tack-free by being crosslinked between carboxyl groups by polyvalent cations, preferably metal cations, while leaving the polymer along at least one broad surface of the layer uncrosslinked and tacky. The portion of the adhesive layer which is crosslinked has greatly increased tensile strength and much reduced extensibility.

When the polymer is substantially tack-free across one of the broad surfaces of the adhesive layer, that surface may be covered with a low-adhesion backsize coating, thus permitting the adhesive layer to be wound (without a backing) directly upon itself in roll form for convenient storage and shipment and later unwound and dispensed as are other pressure-sensitive adhesive tapes. Even without a low-adhesion backsize coating, some such tapes can be wound upon themselves and later unwound without delaminating, expecially if not stored for prolonged periods of time.

Both broad surfaces of some other pressure-sensitive adhesive tapes of the invention are tacky, and the polymer is crosslinked only along one or both edges of the adhesive layer. A substantially tack-free edge surface eliminates problems such as oozing and dirtiness that have been disturbing in the use of some prior pressure-sensitive adhesive tapes. When both of its broad surfaces are tacky and only one or both edges of the adhesive layer of the novel pressure-sensitive adhesive tape are substantially tack-free, it should have a backing which may or may not have a low-adhesion surface to permit the adhesive layer to be removed for such purposes as to join two substrates adhesively.

A preferred pressure-sensitive adhesive for the novel tape comprises a copolymer of (a) from 88 to 97 parts of one or more acrylic acid esters of non-tertiary alkyl alcohol having a chain of 1 to 14 carbon atoms, and (b) correspondingly 12 to 3 parts of one or more copolymerizable monomers such as the vinyl carboxylic acid monomers acrylic acid, methacrylic acid, and itaconic acid. Preferably, the average chain of the alcohol has 4 to 12 carbon atoms. Such a copolymer can both be aggressively tacky and have high cohesive strength, retaining those properties after being stored in tape form for years at ordinary room temperatures. Furthermore, pressure-sensitve adhesive layers of these polymers have good water-vapor transmission, allowing them to remain in contact with the human skin for prolonged periods without injury. The crosslinking of such a polymer along a broad surface of the adhesive layer in tapes of the invention provides even better water-vapor transmission.

Another preferred pressure-sensitive adhesive for a tape of the invention comprises copolymers of (a) about 90–20 parts by weight acrylic acid ester of non-tertiary alkyl alcohol having a chain of 1 to 14 carbon atoms, (b) about 10–80 parts by weight copolymerizable vinyl carboxylic acid monomer such as acrylic acid, methacrylic acid, and itaconic acid, some of the carboxyl groups of which have been neutralized by reaction with an alkanolamine, and (c) tack-promoting material in an amount sufficient to provide good tackiness.

A third preferred pressure-sensitive adhesive for a tape of the invention may be prepared as taught in the above-cited U.S. Pat. No. 4,524,087. That adhesive comprises a polymer of an ionic unsaturated free radically polymerized material such as acrylic acid combined with a crosslinking agent and free radical initiator (as outlined above), which are polymerized from an adhesive precursor containing a polyhydric alcohol such as glycerol. It is believed that the polyhydric alcohol hydrogen bonds to the other materials and so may be considered to be an integral part of the polymeric adhesive.

The adhesive layer of a tape of the invention based on one of the classes of pressure-sensitive adhesives identified in the preceding three paragraphs can be crosslinked along a surface simply by applying a Lewis acid, a polyvalent cation, or a polyvalent organo-metallic complex or salt, either with or without a solvent which does not disrupt the adhesive layer. When no solvent is used, the crosslinking penetration will depend upon the fluidity and viscosity of the polymer being crosslinked. When a solvent is used, the polyvalent metal or other cations can penetrate to a considerable depth quite rapidly, but the depth of crosslinking can be controlled either by limiting the amount of cations applied or by removing unreacted cations, e.g., by washing, by squeegeeing, or by an air jet. When the tape includes a backing to which the adhesive layer is permanently adhered, crosslinking at one broad surface and the edge surfaces can be achieved by momentarily dipping the tape into a solution of Lewis acid, polyvalent cation, or organo-metallic complex or salt.

The solution of Lewis acid, polyvalent cation, or organic-metallic complex or salt preferably is aqueous for reasons of economy and safety, except in those cases where hydrolysis would occur. Solvents other than water are needed where diffusion of the cations into the adhesive layer from an aqueous system would be inhibited, e.g., when crosslinking of the surface carboxyl groups produces a hydrophobic barrier. When using a solvent other than water, it preferably is readily miscible with water and relatively polar, preferably an alcohol such as ethanol or isopropanol. Other useful water-miscible solvents include acetone, methyl ethyl ketone, ethyl acetate, and N,N-dimethylformamide. When using water-miscible solvents to carry the polyvalent cations, the depth of crosslinking can be economically controlled by washing with water.

Useful Lewis acids includes $ZnCl_2$, $TiCl_4$, $FeCl_3$, and $AlCl_3$. Solutions of $AlCl_3$ should not be exposed to the atmosphere except during use, or absorbed water may interfere with penetration of the aluminum cations and also result in a powdery deposit at the surface being treated. However, $AlCl_3$ does not color the adhesive as do some other Lewis acids such as $FeCl_3$. Because of their low cost and nontoxicity, the Lewis acids named above are preferred. For uses in which any corrosion must be avoided, a polyvalent organo-metallic complex or salt is preferred to a Lewis acid. Exemplary complexes and salts include zinc octanoate, calcium acetate, aluminum triisopropoxide, tetra-n-butyl titanate, titanium acetyl acetonate, and lactic acid titanium chelates.

The crosslinking of the polymer along a broad surface of the adhesive layer affords greatly improved strength, thus allowing the adhesive layer to be used without a backing. However, in tapes of the invention which have no backings, greatly enhanced strength and integrity can be provided by a tissue-like scrim, preferably of cellulose or nylon, embedded in and coextensive with said adhesive layer. Such a scrim does not substantially lessen the conformability of the adhesive layer.

When the polymer is crosslinked along a broad surface of the adhesive layer, this affords a leathery or silk-like feel. Microscopic examination reveals a wrinkling of the adhesive layer which cannot be detected by the naked eye. The crosslinking greatly reduces stretchability, so that when the tape is microscopically examined after being moderately stretched, crosslinked areas can be ruptured without breaking the underlying tacky adhesive, thus confirming that the adhesive layer has not been crosslinked adjacent that tacky surface while being crosslinked adjacent the other broad surface. The respectively tacky and substantially tack-free nature of those surfaces likewise confirms this.

Both broad surfaces of the adhesive layer may be treated to become crosslinked to a minor portion of the layer thickness. The adhesive layer may then be stretched to fracture the crosslinked portions, thus exposing the still-tacky core by which the adhesive layer can be adhered to a substrate or used to adhesively bond two substrates together.

The polymer of a pressure-sensitive adhesive tape can be crosslinked in tiny, separated areas along one broad surface of the adhesive layer by using a half-tone printing plate to print tiny dots onto the surface with a solution of a Lewis acid, polyvalent cations, or a polyvalent organo-metallic complex or salt. Crosslinking initiated where the polyvalent cations contact the polymer puckers the adhesive surface to create microscopic mounds which are substantially tack-free and are separated by narrow tacky areas. The surface of the adhesive layer thus becomes virtually nontacky under light pressure, but adhesive bonds can be made by pressing the surface against a substrate. The strength of those bonds is dependent upon the pressing force.

THE DRAWING

Figure 2:
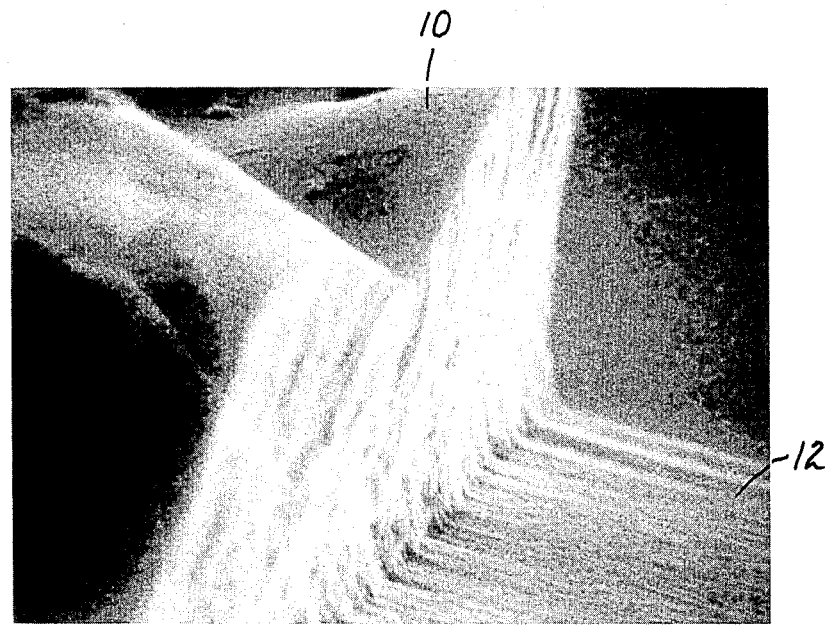

In the drawing,

FIG. 1 is a scanning electron micrograph at a magnification of 200X showing a broad surface of a tape of the invention which has been moderately stretched to break the crosslinked portion of its adhesive layer without breaking the uncrosslinked portion; and FIG. 2 is a similar micrograph of the same tape at a magnification of 5000X.

In the areas 10 of FIG. 1, the portion of the adhesive layer along the broad surface being viewed has been crosslinked, thus puckering that surface which originally had been relatively smooth. Stretching of the tape has produced rifts in the crosslinked portion, revealing areas 12 where uncrosslinked adhesive has elongated to bridge the rifts. As better seen in FIG. 2, the crosslinking extends uniformly into the adhesive layer. The nonuniform depth of the crosslinked portion is attributed to the resulting puckering.

In the following examples, all parts are by weight unless otherwise noted.

EXAMPLE 1

A cellulose scrim (8-pound "Crystex Tissue" supplied by Crystal Mills, Middletown, Ohio) had been coated on both sides with a pressure-sensitive adhesive polymer of the type disclosed in U.S. Pat. No. 3,865,770 and prepared from

|  | Parts |
| --- | --- |
| n-butyl acrylate | 400 |
| acrylic acid | 133 |
| N—methyl diethanolamine | 266 |
| rosin tackifier | 160 |
| polyethylene glycol monophenyl ether (ave. mol. wgt. 270) | 106 |

The double-coated scrim-reinforced adhesive layer had a thickness of about 0.09 mm and was carried by a coated paper backing having a release surface. Carboxyl groups comprised 7.8% of the weight of the adhesive. Strips (12×2.5 cm) of this paper-backed tape were immersed in 0.05M $FeCl_3.6H_2O$ in absolute ethanol and immediately dipped momentarily into water to wash away any unreacted ferric chloride. After drying in air at room temperature, the strips were peeled from the coated paper backing and tested for tensile strength in an Instron Tensile Tester under ASTM Test Method D 882-75b, with the following results:

| Tape | Immersion time (min.) | Elongation at max. load (%) | Tensile strength (kPa) |
| --- | --- | --- | --- |
| A | 0 | 5 | 2700 |
| B | 0.25 | 10 | 3300 |
| C | 1 | 10 | 2950 |
| D | 2 | 15 | 3600 |
| E | 5 | 10 | 5900 |
| F | 15 | 10 | 8550 |
| G | 30 | 10 | 10350 |
| H | 60 | 10 | 13550 |

The exposed surface of each of Tapes B-H had a beige color and was completely tack-free to the touch. The exposed surface of Tape A and the underlying surfaces of each of Tapes A-F were aggressively tacky to the touch and no difference in their tackiness was apparent. The underlying surface of Tape G had reduced tackiness, and that of Tape H was almost tack-free, indicating that substantially its entire adhesive layer had become crosslinked by the metal cations.

The adhesive layers of Tapes E and F had adequate strength to be marketed without backings and could be wound upon themselves in roll form for convenient storage and shipment, preferably after first applying low-adhesion backsize coatings to their tack-free surfaces Two other strips of the paper-backed, double-coated resin were immersed in the 0.05M $FeCl_3.6H_2O$ solution, one momentarily and the other for two hours, and then dipped into water. After drying, the backings were discarded, and the modified adhesive layers were tested for water vapor transmission by ASTM Test Method E96-80, Method 3.2. The transmission of each was at least 328 g/m²/hour, more than adequate for surgical tape use.

EXAMPLE 2

Strips of the tape used in Example 1 were momentarily dipped into a 5% solution of anhydrous aluminum trichloride in anhydrous ethanol and allowed to dry at room temperature without being washed. The exposed surfaces of the dried strips had become completely tack-free to the touch. When peeled from the paper backing, the underlying surface of the adhesive layer appeared to be as aggressively tacky as the surfaces of Tape A. The adhesive layer was clear and colorless. After another of the modified strips were immersed in water at 80° C. for more than one-half hour and then allowed to dry at room temperature, its adhesive layer appeared to be unchanged.

EXAMPLE 3

A strip of the tape used in Example 1 was immersed for 30 seconds in a solution of 5% by weight zinc chloride in anhydrous ethanol and immediately washed in ethanol. After drying, its exposed surface was tack-free to the touch, but when rubbed, some tackiness was evident. The underlying surface of the adhesive layer was as tacky as Tape A.

Another strip of the tape used in Example 1 was immersed to half of its length in the same solution for 30 seconds, and then the entire strip was immediately immersed in water at about 20° C. After about 5 minutes, the untreated section of the tape had become swollen and translucent, whereas the treated section was unchanged. After about one hour, the edge of the treated section had swelled slightly.

A third strip of the tape used in Example 1 was immersed to half its length in the same solution for 30 seconds and then immediately totally immersed in a 5% solution of sodium chloride in water at about 20° C. Neither section of this strip showed any swelling or opacity after one hour.

EXAMPLE 4

A strip of the tape used in Example 1 was immersed in a solution of 1.1 g of zinc octanoate in 10 ml ethanol. After 5 minutes, the strip was allowed to dry without being washed. The exposed surface of the dried strip was completely tack-free to the touch, while the underlying surface of its adhesive layer appeared to be as tacky as Tape A.

EXAMPLE 5

A pressure-sensitive adhesive tape was prepared by coating onto the release surface of a coated paper backing a mixture of 90 parts of isooctyl acrylate and 10 parts of acrylic acid, which mixture had been partially polymerized to a coatable state. After adding a photoinitiator and covering the coating with a releasable transparent plastic film to exclude air, the coating was polymerized to a pressure-sensitive adhesive state by exposure to ultraviolet radiation. The thickness of the adhesive layer of the resulting tape was about 250 micrometers. Carboxyl groups comprised about 2.8% of the weight of the adhesive layer. After removing the transparent plastic film, one strip of the paper-backed tape was momentarily immersed in 0.05M $FeCl_3.6H_2O$ in ethanol, and another in 5% anhydrous $AlCl_3$ in ethanol and then dipped in ethanol to remove unreacted metal cations. After being allowed to dry, the exposed surface of the adhesive layer of each strip was completely tack-free, indicating crosslinking along that surface, and the underlying surface of each adhesive layer appeared to be as tacky to the touch as was Tape A.

The adhesive layer of a strip which had been immersed in the ferric chloride solution was peeled from the paper backing and stretched by hand to break the crosslinked portion while leaving the uncrosslinked portion unbroken. Micrographs of the stretched adhesive layer are shown in FIGS. 1 and 2 of the drawing. The tack-free, crosslinked portion was from 4 to 10 micrometers in thickness, about 2 to 4% of the total thickness of the adhesive layer.

EXAMPLE 6

Used in this example was a tape which was the same as that used in Example 5 except that its adhesive layer had a thickness of about 125 micrometers. While strips of the tape were in a vacuum ($10^{-5}$ mm of $H_g$), they were allowed to equilibrate with pure $TiCl_4$ vapor at room temperature, one for 10 minutes and the other for 30 minutes.

An exposed adhesive surface of the strip thus treated for 10 minutes was almost tack-free but was slightly tacky to the touch. The exposed adhesive surface of the strip treated for 30 minutes was completely tack-free. The underlying surface of the adhesive layer of each strip was aggressively tacky, having been unchanged by the treatment. Both treated adhesive layers were stretchy and conformable and unchanged in these respects compared to untreated adhesive layers. The treatment did not change the clear, colorless, glossy appearance of the adhesive layers when examined with the naked eye.

EXAMPLE 7

The exposed adhesive surface of a roll of the starting tape used in Example 5 was printed with a 0.05M solution of $FeCL_3.6H_2O$ in ethanol using a demonstration half-tone flexographic printing plate (ByChrome Co., Inc., Columbus, Ohio) on a rotary press. The largest dots on the printing plate had a diameter of 290 micrometers and a spacing of 250 micrometers. The smallest dots had a diameter of 65 micrometers and a spacing of 170 micrometers. Microscopic examination showed tiny, beige-colored, tack-free mounds of approximately the diameter of the corresponding dots of the printing plate. The face of the printed tape was virtually non-tacky when lightly touched but felt rather tacky under greater fingertip pressure. When a piece of the printed adhesive layer was stretched, the size of each mound remained unchanged while the spacings between the mounds was enlarged, and the face of the printed adhesive layer then felt quite tacky when lightly touched. When another piece of the printed adhesive layer was lightly pressed against a substrate, it became lightly adhered, and the degree of adhesion increased under increased pressure until the printed adhesive layer became strongly adhered to the substrate

EXAMPLE 8

A tape had a cellulose acetate backing and a pressure-sensitive adhesive layer consisting of a copolymer of 95 parts of isooctyl acrylate and 5 parts of acrylic acid, of which polymer carboxyl groups comprised about 3.1% of its weight. One strip of this tape was momentarily immersed in 0.05M $FeCl_3.6H_2O$ in ethanol and another in anhydrous $AlCl_3$ in ethanol, and then dipped in ethanol. After being allowed to dry, the exposed adhesive surface of each strip was only slightly tacky to the touch, whereas the underlying surface of the adhesive layer appeared to be as tacky to the touch as the surfaces of Tape A. Upon rubbing the exposed surface of the treated adhesive layer of each strip, it became very tacky to the touch.

EXAMPLE 9

A tape had a paper backing having a silicone resin release coating over which a pressure-sensitive adhesive layer consisting of a copolymer of isooctyl acrylate and acrylic acid in 94.6 ratio had been coated from a 22% solution in heptane and isopropyl alcohol (70:30) and heated at gradually increasing temperatures to provide a dry adhesive weight of 81.5 mg/m$^2$. The thickness of the dried adhesive layer was about 0.2mm.

Onto the uncoated surface of the paper backing was applied a barrier layer which was a terpolymer of 92 parts vinyl chloride, 6 parts vinyl acetate and 2 parts vinyl alcohol ("VAGH #1" supplied by Union Carbide Chemicals Co.). The barrier layer comprised about 2 grains per 24 square inches (84 mg/m$^2$). A silicone low-adhesion backsizing was coated over the barrier layer.

Pieces were then laid up in a slab and guillotined into pads, each having multiple long, narrow strips. The long edges of the strips were then treated with tetra-n-butyl titanate ("Tyzor" TBT sold by Union Carbide Chemicals Co.) to crosslink the pressure-sensitive adhesive along both edges of the strips to detackify the adhesive, thus reducing the migration of the adhesive from the edges of the pads and also reducing soiling of the edges of the pad during storage and use.

EXAMPLE 10

A coating of the following adhesive precursor solution was polymerized to provide a pressure-sensitive adhesive layer which is useful for attaching biomedical electrodes to the skin:

|  | Parts |
| --- | --- |
| Glycerol | 62 |
| Acrylic acid | 22 |
| Water | 13 |
| Triethyleneglycol-bis-methacrylate | 0.06 |
| 2,2-dimethoxy-2-phenyl acetophenone photoinitiator ("Irgacure" 651) | 0.07 | plus 3 parts of salts, e.g., to enhance electrical conductivity.

In accordance with teachings of the above-cited U.S. Pat. No. 4,524,087 the solution was knife-coated onto silicone coated paper which was then passed through an inert chamber ($N_2$ atmosphere) under a bank of UV lamps to polymerize the coating to a pressure-sensitive adhesive state. Carboxyl groups comprised about 17% by weight of the polymerized coating which had a thickness of about 0.8 mm.

A strip of this tape was momentarily immersed in 0.05M $FeCl_3.6H_2O$ in ethanol, and another strip was momentarily immersed in 0.05M $FeCl_3.6H_2O$ in water. After drying, the exposed adhesive surface of each strip was completely tack-free, and the underlying surface of the adhesive layer was highly tacky and unchanged in tackiness.

EXAMPLE 11

Tape was prepared as in Example 1 except that its backing was biaxially-oriented poly(ethylene terephthalate) film coated with a conductive silver paint and its adhesive precursor was:

|  | Parts |
| --- | --- |
| Glycerol | 66.7 |
| Acrylic acid | 15.6 |
| Water | 12.8 |
| Triethyleneglycol-bis-methacrylate | 0.37 |
| 2,2-dimethoxy-2-phenyl acetophenone | 0.07 | plus 4.5 parts of salts. The adhesive layer of the tape had a thickness of 800 micrometers.

A number of strips of this tape were immersed in 0.05M $FeCl_3.6H_2O$ in ethanol for periods of time given below and then immediately dipped into water. After drying, the exposed adhesive surface of each strip was tack-free, and the underlying surface of its adhesive layer was aggressively tacky to the touch. No differences in thier tackiness was apparent.

After freezing and breaking each strip, the broken edge was microscopically examined to determine the thicknesses of their crosslinked portions as follows:

| After immersion for | Depth of Crosslinking (micrometers) |
| --- | --- |
| 10 seconds | 220 |
| 20 seconds | 220 |
| 40 seconds | 550 |
| 80 seconds | 740 |

We claim:

1. A method of rendering substantially tack-free two broad surfaces of a pressure-sensitvie adhesive layer, which adhesive layer comprises a polymer of which carboxyl groups originally comprise at least about 3.1% of the weight, said method comprising applying to both broad surfaces a nonaqueous medium containing a Lewis acid, a polyvalent cation, or a polyvalent organo-metallic complex or salt to crosslink the polymer along the broad surfaces to a substantially tack-free state, leaving a still-tacky core which can be exposed by stretching the adhesive layer.

2. A method as defined in claim 1 wherein carboxyl groups comprise from about 3.1% to about 22% by weight of the polymer.

3. A method of producing substantially tack-free separated mounds on at least one broad surface of a pressure-sensitive adhesive layer while leaving the spacings between the mounds tacky, which adhesive layer comprises a polymer of which carboxyl groups originally comprise at least about 3.1% of the weight, said method comprising applying to the adhesive layer a dot pattern of a nonaqueous medium containing a Lewis acid, a polyvalent cation, or a polyvalent organo-metallic complex or salt to form the mounds and crosslink the polymer at the mounds to a substantially tack-free state.

4. A method as defined in claim 3 wherein carboxyl groups comprise from about 3.1% to about 22% by weight of the polymer.

5. Method of making substantially tack-free one surface of a pressure-sensitive adhesive layer while leaving another surface tacky, which adhesive layer comprises a polymer of which carboxyl groups originally comprise at least about 3.1% of the weight, said method comprising applying to said one surface a nonaqueous medium containing a Lewis acid, a polyvalent cation, or a polyvalent organo-metallic complex or salt to crosslink the polymer along said one surface to a substantially tack-free state while leaving another surface uncrosslinked and tacky.

6. Method as defined in claim 5 wherein the nonaqueous medium containing the Lewis acid, polyvalent cation, or organo-metallic complex or salt is selected from the group consisting of methanol, ethanol, isopropanol, acetone, methyl ethyl ketone, N,N-dimethylformamide, and combinations thereof.

7. Method as defined in claim 5 comprising the further step of washing said one surface to remove excess cations to stop the crosslinking.

8. Method as defined in claim 5 wherein said Lewis acid, polyvalent cation, or polyvalent organo-metallic complex or salt is applied to an edge surface of the adhesive layer.

9. Method as defined in claim 5 wherein carboxyl groups comprise from about 3.1% to about 22% by weight of the polymer.

10. Method as defined in claim 5 further comprising the step of applying a low-adhesion backsize coating to the tack-free surface of the adhesive layer.

11. Method as defined in claim 5 wherein said polymer is a copolymer containing monomers including an acrylic acid ester of a non-tertiary alkyl alcohol having a chain of 1 to 14 carbon atoms.

12. Method as defined in claim 11 wherein the non-tertiary alkyl alcohol contains an average of 4—12 carbon atoms.

13. Method as defined in claim 11 wherein said copolymer consists essentially of about 90-20 parts by weight of said acrylic acid esters of non-tertiary alkyl alcohols and correspondingly about 10-80 parts by weight of vinyl carboxylic acid monomers copolymerizable with said acrylic acid esters.

14. Method as defined in claim 13 wherein said vinyl carboxylic acid monomers are selected from the group consisting of acrylic acid, methacrylic acid, itaconic acid, and combinations thereof.

15. Method as defined in claim 5 wherein the polyvalent cation is applied to said one surface, said polyvalent cation being a metal cation selected from the group consisting of Zn, Ti, Fe, Al, and combinations thereof.

16. Method as defined in claim 5 wherein a scrim is embedded in and coextensive with said adhesive layer.

17. Method as defined in claim 5 wherein said scrim is a cellulose scrim.

* * * * *

UNITED STATES PATENT AND TRADEMARK OFFICE
CERTIFICATE OF CORRECTION

PATENT NO. : 4,751,108

DATED : June 14, 1988

INVENTOR(S) : Larimore et al.

It is certified that error appears in the above-identified patent and that said Letters Patent is hereby corrected as shown below:

Column 3, line 1, "expecially" should be --especially--.

Column 9, line 55, "thier" should be --their--.

Column 10, line 3, "sensitvie" should be --sensitive--.

Signed and Sealed this

Eighth Day of November, 1988

Attest:

DONALD J. QUIGG

Attesting Officer

Commissioner of Patents and Trademarks